United States Patent
Giaccone

[15] 3,685,772
[45] Aug. 22, 1972

[54] RESILIENT BUSH

[72] Inventor: Giuseppe Giaccone, Corso Dante 90, Turin, Italy

[73] Assignee: RIV-SKf Officine di Villar Perosa S.P.A., Turin, Italy

[22] Filed: July 23, 1970

[21] Appl. No.: 57,606

[30] Foreign Application Priority Data

Aug. 4, 1969 Italy .................52885-A/69
July 15, 1970 Italy .....................868501/70

[52] U.S. Cl. ..........................248/9, 248/15, 267/153
[51] Int. Cl. ..............................................F16f 15/08
[58] Field of Search..............248/3, 5, 7, 8, 9, 15, 22, 248/26, 358; 180/64 R; 267/153, 141

[56] References Cited

UNITED STATES PATENTS

| | | | |
|---|---|---|---|
| 3,455,525 | 7/1969 | Waermo | 248/15 |
| 2,658,710 | 11/1953 | Titus | 248/358 R |
| 2,096,139 | 10/1937 | Spahr | 248/26 |
| 3,532,319 | 10/1970 | Brown | 248/358 R |

FOREIGN PATENTS OR APPLICATIONS

| | | | |
|---|---|---|---|
| 1,066,745 | 4/1967 | Great Britain | 267/153 |
| 529,581 | 8/1955 | Italy | 248/9 |
| 564,215 | 9/1944 | Great Britain | 248/358 R |
| 664,231 | 1/1952 | Great Britain | 248/358 R |
| 484,801 | 9/1953 | Italy | 248/358 R |

*Primary Examiner*—J. Franklin Foss
*Attorney*—Sughrue, Rothwell, Mion, Zinn & Macpeak

[57] ABSTRACT

A resilient bush formed from a rubber block with internal and external metal sleeves. The rubber block is placed between the sleeves under compression. In its uncompressed state the block is generally cylindrical with an annular groove on each end face and an annular groove round the mid-point of the cylindrical surface of the block: this groove has a varying cross section so that the bush presents a resilience which is dependent on the direction the load acts.

4 Claims, 7 Drawing Figures

PATENTED AUG 22 1972 3,685,772

INVENTOR
GIUSEPPE GIACCONE

BY Sughrue, Rothwell, Mion, Zinn & Macpeak
ATTORNEYS

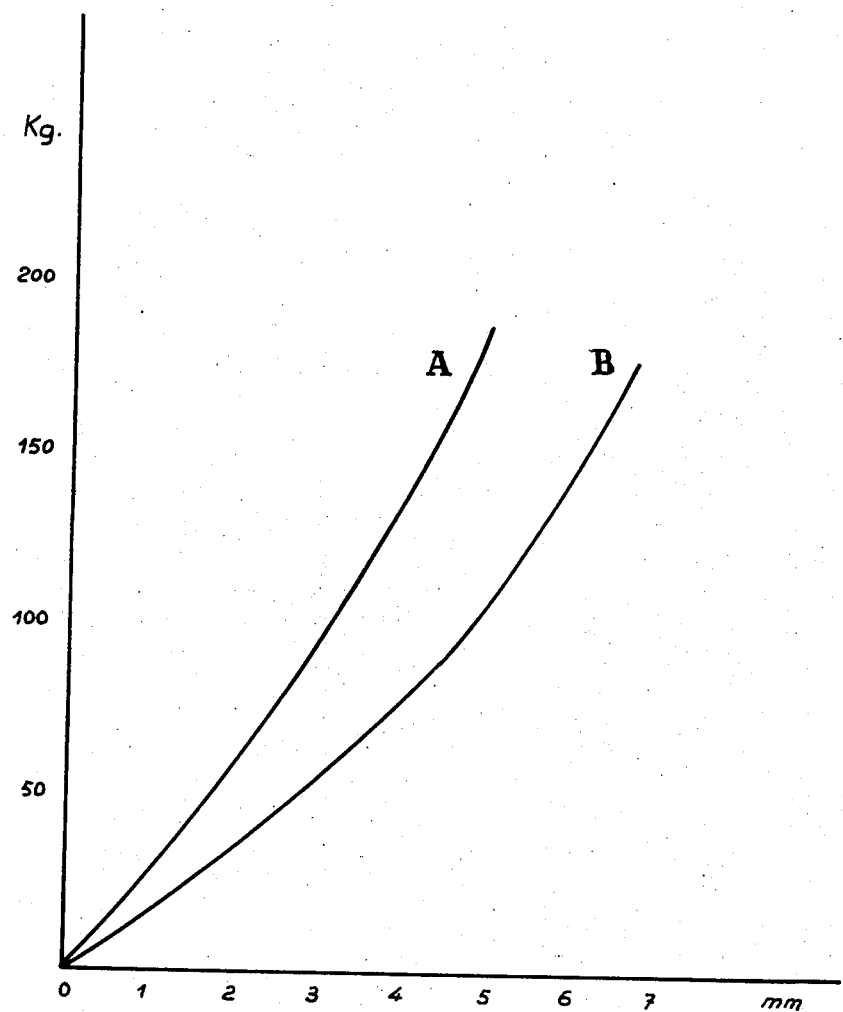

INVENTOR
GIUSEPPE GIACCONE

RESILIENT BUSH

The present invention relates to resilient bushes designed to make a resilient connection between a stud member and an eye member.

In particular this invention relates to resilient bushes of the type which include a block of resilient material such as rubber interposed at pressure between two metal sleeves and having circular grooves on each of its end faces. In this specification the term "rubber block" will be understood to mean a block of any resilient material, either natural or synthetic, which has the sort of resilience provided by rubber.

It is known, when making such a bush of the "silent block" type for the suspension of engines in motor vehicles to use rubber bushes comprising a rubber block interposed at pressure or vulcanized between an inner and an outer metal sleeve, so as to achieve a resilient connection between the engine and the motor vehicle.

In order to achieve a high radial and axial flexibility of these resilient bushes, it is known to make annular grooves in the end faces of the rubber block which grooves, as a result of yielding under load, make it possible to obtain a flexibility which varies according to the extent of the load.

It is also known to make resilient bushes having a variable flexibility in different radial directions. This characteristic is obtained by means of openings extending along the whole circumference of the rubber block in such a way that, according to the direction of the load, the cross section of the rubber block is different, and hence the reaction of the block is different.

According to the present invention there is provided a resilient bush of the type comprising a rubber block interposed under pressure between two metal sleeves in which the rubber block has at least one annular groove on each end face, and an outer cylindrical surface, in a medial position along which there is formed an annular groove the depth and width of which vary along its length.

One embodiment of the invention will now be described by way of example, with reference to the accompanying drawings, in which:

FIG. 3 is a graph showing radial flexibility along two orthogonal radial directions of the resilient bush illustrated in FIG. 1;

Figure 2:
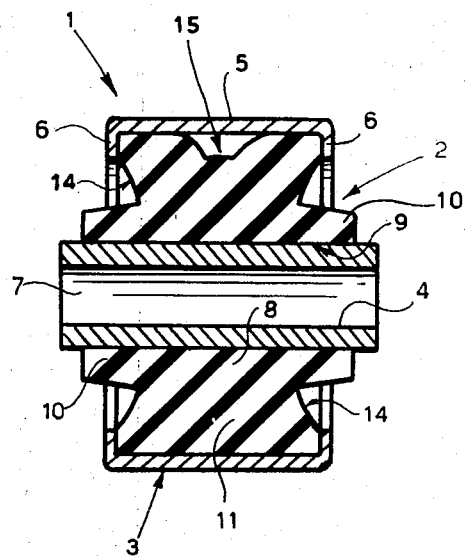
FIG. 2 is a section taken along the line II — II of FIG. 1.
Figure 1:
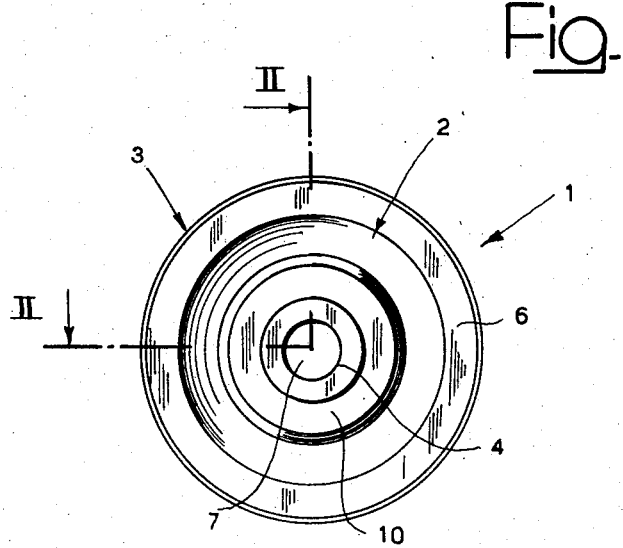
FIG. 1 is a plan view of a resilient bush constructed according to this invention.
Figure 4:
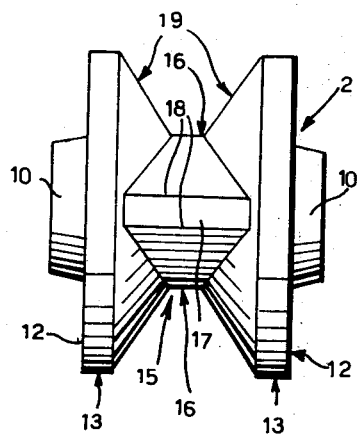
FIGS. 4 and 5 are two lateral views along two orthogonal planes of the rubber block of the resilient bush illustrated in FIG. 1.
Figure 5:
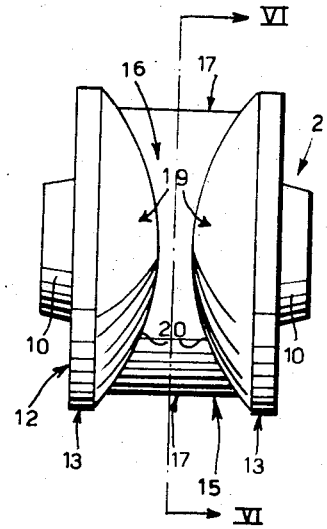
Figure 6:
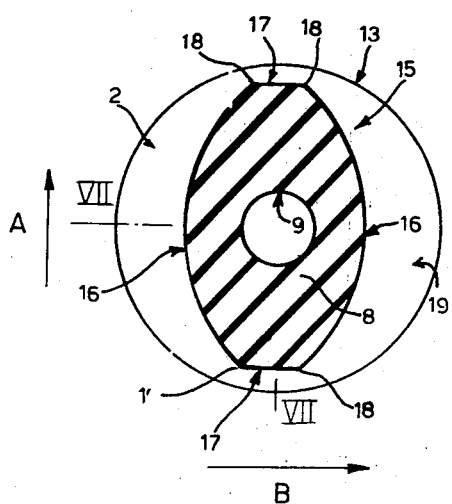
FIG. 6 is a section along the line VI — VI of FIG. 5.
Figure 7:
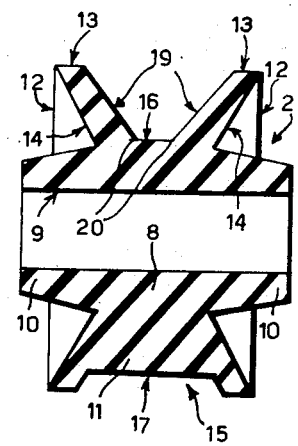
FIG. 7 is a section along the line VII — VII of FIG. 6.

Referring now to FIG. 1, the numeral 1 indicates a resilient bush comprising a rubber block 2 interposed at pressure between two metal sleeves, an outer sleeve 3 and an inner sleeve 4. The outer metal sleeve 3 consists of a cylindrical band 5 which has two small, inwardly facing annular flanges 6, at the ends thereof; the inner metal sleeve 4 on the other hand comprises just a cylindrical member having a passage 7 by means of which the bush may be attached to a pin or stud member.

The rubber block 2 shown in FIGS. 4 to 7 comprises a substantially cylindrical portion 8 having an axial aperture 9 within which the inner metal sleeve 4 is fitted, and having axial extensions 10 which are slightly tapered toward their ends. The cylindrical portion 8 has a cylindrical surface 13, in a medial position along which there is formed an annular groove 15 having a cross-section, of isosceles trapezoid form, while the ends 12 of the cylindrical surface 13 each have an annular groove 14 with a triangular cross-section. The annular groove 15 varies in depth and width along its length and may be sub-divided into four parts, in equal and opposite pairs marked respectively 16 and 17.

The part 16 of the bottom of the annular groove 15 is cylindrical with a radius greater than that of the cylindrical surface 13 and an axis parallel to, but not coincident with, that of the bush 1. The parts 17 of the bottom of the annular groove 15 are on the other hand, plane and they connect at each end along the lines 18 the two cylindrical surfaces 16 which form the remainder of the base of the annular groove 15. The junction 20 of the cylindrical surfaces 16 with sloping surfaces 19 which form the sides of the annular groove 15 is circular when viewed in an axial direction.

Owing to the shaping of the annular groove 15, the bush has a maximum cross-section in a line joining the parts 17 which diminishes gradually to a minimum along a line joining the mid points of the parts 16. As can be seen in FIG. 1 when the bush is compressed for fitting between the sleeves 5 and 9 the cross-section of the annular groove 15 is reduced to practically nothing in the region of the parts 17.

This variable cross-section causes the block 2 to have a variable rigidity according to the radial direction in which the load acts. In the graphs of radial flexibility of the rubber bush 1 illustrated in FIG. 3, two curves are shown, the first of which, marked A, shows the relative displacement of the parts of the block 2 between which a load acts (that is the inner and outer metal sleeves) when the load acts in the direction of the arrow A of FIG. 6 while the other curve, marked B, shows the relative displacement of the sleeves when the load acts in the direction of the arrow B of FIG. 6.

In the embodiment just described the flexibility of the resilient bush 1 varies continuously between a high and a low value in accordance with the variation of the radial direction along which the load acts; the curve showing the variation of flexibility with radial direction of load could have an approximately sinusoidal course without having relative maxima and minima between the absolute maxima and minima.

However it is always possible to construct for special requirements a block having a profile of the annular groove 15 such as will give to the resilient bush 1 an elasticity which varies non-sinusoidally according as the direction of the load varies so as to have relative maxima and minima between an absolute maximum and an absolute minimum of flexibility.

The profile and the course of the annular slot can also be varied so as to vary the radial flexibility and also the axial incidence of the resilient bush 1.

Naturally, the principle of the invention being unchanged, the details of construction may be widely varied from what has been illustrated and specified purely by way of non-restrictive example, without nevertheless going beyond the scope of this invention as defined in the following claims.

I claim:
1. A variable force resilient joint comprising:
   a. a cylindrical rubber body formed with a pair of opposed, V-shaped circular grooves in its end faces and with a single, centrally located, trapeze-shaped circumferential groove flaring radially outwardly;
   b. a pair of concentrical rigid sleeves internal and external to said body, between which the latter is pre-compressed in the radial direction;
   c. the outer sleeve having a radially inwardly directed flange at each end thereof in axial abutment contact with its adjacent end face of the body along an annular region situated radially beyond the groove in said adjacent end face;
   d. the width of the mouth of the trapeze-shaped groove being substantially constant along the length of the groove, and
   e. the depth of the trapeze-shaped groove and the width of the bottom surface of the latter being variable along the length of the groove in a manner wherein said depth increases as said width decreases and vice versa.

2. The resilient bush of claim 1, wherein the bottom of said centrally located groove consists of two equal, axially opposed cylindrical surfaces joined by two equal, axially opposed plane surfaces.

3. The resilient bush of claim 2, wherein said cylindrical parts of said bottom of said groove have a radius greater than that of said cylindrical surface of said bush, and an axis parallel to that of said cylindrical surface but not coincident with it.

4. The resilient bush as of claim 2, in which said cylindrical parts of said bottom of said groove connect to the inclined walls of said groove along lines having a circular course when viewed in an axial direction.

* * * * *